(12) United States Patent
Toyofuku et al.

(10) Patent No.: US 6,720,401 B2
(45) Date of Patent: Apr. 13, 2004

(54) COATING COMPOSITION

(75) Inventors: Masanori Toyofuku, Ibaraki (JP); Satoru Mori, Ibaraki (JP); Josho Kashiwame, Kanagawa (JP); Kaoru Oguro, Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 09/874,060

(22) Filed: Jun. 6, 2001

(65) Prior Publication Data

US 2002/0013426 A1 Jan. 31, 2002

(30) Foreign Application Priority Data

Jun. 12, 2000 (JP) ........................................ 2000-175876
Jun. 19, 2000 (JP) ........................................ 2000-182766

(51) Int. Cl.$^7$ ............................ C08B 18/48; C08B 1/10; C08B 18/12; C08B 18/76
(52) U.S. Cl. .................. 528/59; 428/423.1; 528/61; 528/65; 528/77; 528/904
(58) Field of Search ............................ 528/59, 61, 65, 528/77, 904; 428/423.1

(56) References Cited

U.S. PATENT DOCUMENTS 3,769,071 A   10/1973   Trancik ................. 117/68.5

FOREIGN PATENT DOCUMENTS

DE   42 36 562   5/1994
EP   0 218 881   4/1987

OTHER PUBLICATIONS

Derwent Abstract, JP 3–229773, Oct. 11, 1991.

Primary Examiner—Rabon Sergent
(74) Attorney, Agent, or Firm—Oblon, Spivak, McClelland, Maier & Neustadt, P.C.

(57) ABSTRACT

1. A coating composition to form a coating layer or film of a hydrophilic polyurethane resin having a moisture permeability and being substantially non-porous, which comprises, as an essential component, an isocyanate group-containing prepolymer obtainable by reacting diphenylmethane diisocyanate with the following polyoxyalkylene polyol:

A polyoxyalkylene polyol which contains at least 60 wt % of a polyoxyethylene polyol having at least three hydroxyl groups and having an oxyethylene group-content of at least 10 wt %, satisfies $3.0 < n < 3.5$, where n is the average number of hydroxyl groups, and has an average oxyethylene group-content of from 60 to 90 wt %.

8 Claims, No Drawings

COATING COMPOSITION

The present invention relates to a novel coating composition to form a coating layer or film of a polyurethane resin which has a moisture permeability and is substantially non-porous.

It is known to form a layer of a hydrophilic polyurethane resin which is substantially non-porous, on a porous base material such as cloth, to produce a moisture permeable material suitable for application to clothing material. The layer of this hydrophilic polyurethane resin absorbs moisture from a high humidity side and discharges moisture to a low humidity side thereby to provide a moisture permeability.

As compared with a conventional polyurethane resin layer having numerous fine pores formed by a method such as a wet solidification method, a method by elution of fine soluble particles or a foaming method, the non-porous layer of the hydrophilic polyurethane resin is free from clogging of pores and is excellent also in the water-proofing property. The porous base material having such a non-porous hydrophilic polyurethane resin layer formed, is disclosed, for example, in JP-A-58-203172 or JP-A-58-222840.

To form a layer of a hydrophilic polyurethane resin, it is common to employ a method wherein a coating composition selected from a solution and a dispersion of a hydrophilic polyurethane resin, a mixture of raw materials for a hydrophilic polyurethane resin and a solution and dispersion thereof, is directly or indirectly coated on a porous base material to form a coating layer.

The above "indirectly" means a method wherein a coating layer not completely cured, is formed on a substrate having a release property, and then such a coating layer is laminated on the porous base material, and in some cases, an adhesive may be employed at the time of such lamination (see the above-mentioned JP-A-58-203172). Otherwise, a sufficiently cured hydrophilic polyurethane resin film may firstly be formed, and such a film may be laminated on the porous base material. Such a film is usually prepared by coating the above-mentioned coating composition on a substrate having a release property and curing it, and such a film peeled from the substrate having a release property is laminated on the porous base material, or such a film as supported on the substrate having a release property, may be laminated on the porous base material, and then the substrate having a release property is peeled to obtain the porous base material having the film laminated thereon.

For such lamination, the adhesive property or the fusing property of the hydrophilic polyurethane resin itself may be utilized, or an adhesive may be employed. The moisture permeability can be maintained by using, as the adhesive, an adhesive having moisture permeability (it is possible to increase the moisture permeability by adjusting the adhesive layer to be thin) or by applying the adhesive partially (for example, in a pattern of dots or lines).

The hydrophilic polyurethane resin is obtained usually from a highly hydrophilic polyol and a polyisocyanate compound as the main materials. In many cases, a two-pack coating composition consisting of a combination of an isocyanate group-containing prepolymer obtainable by reacting a highly hydrophilic polyol with a polyisocyanate compound, with a curing agent for the isocyanate group-containing prepolymer, is employed. As the curing agent, a polyfunctional active hydrogen compound having a low molecular weight, such as a diol or a diamine, is employed.

As mentioned above, the hydrophilic polyurethane resin is obtained from a highly hydrophilic polyol and a polyisocyanate compound as the main starting materials. As such a highly hydrophilic polyol, polyoxyethylene glycol has been commonly employed. However, use of such polyoxyethylene glycol brings about various problems.

Firstly, when a higher moisture permeability is desired, with a hydrophilic polyurethane resin employing polyoxyethylene glycol, the moisture permeability is inadequate in some cases. Namely, there is a limit in the moisture permeability of such a hydrophilic polyurethane resin, and it is difficult to accomplish a moisture permeability of a level higher than a predetermined level.

Secondly, when the isocyanate group-containing prepolymer is cured by a curing agent, the curing speed is very slow, and high speed coating and curing are difficult, whereby there is an operational or economical problem.

Thirdly, the isocyanate group-containing prepolymer employing polyoxyethylene glycol is solid or liquid having high viscosity at room temperature, and its handling is difficult. Usually, such an isocyanate group-containing prepolymer employing polyoxyethylene glycol is used as dissolved in a solvent in many cases, but use of such a solvent is likely to bring about an environmental or economical problem, and a coating composition having the amount of such a solvent reduced or containing substantially no solvent, is desired.

Fourthly, the mechanical properties used to be inadequate in some cases with the polyurethane resin obtained by using polyoxyethylene glycol.

An invention disclosing a coating composition to form a coating layer or film which maintains the flexibility or elongation of the above-mentioned polyurethane resin to some extent and which yet has high mechanical strength (JP-A-62-57467) or an invention disclosing a coating composition to form a coating layer or film having a high moisture permeability and elongation (JP-A-3-229773) has also been reported. However, with coating layers formed of such conventional coating compositions, mechanical strength such as durability or abrasion resistance has not been adequate. Further, the degree of swelling upon absorption of water tends to be high, and there has been a problem that the washing durability deteriorates.

The present invention is to solve the above problems and provides a coating composition to form a coating layer or film of a hydrophilic polyurethane resin having a moisture permeability and being substantially non-porous, which comprises, as an essential component, an isocyanate group-containing prepolymer obtainable by reacting diphenylmethane diisocyanate with the following polyoxyalkylene polyol:

A polyoxyalkylene polyol which contains at least 60 wt % of a polyoxyethylene polyol having at least three hydroxyl groups and having an oxyethylene group-content of at least 10 wt %, satisfies $3.0<n<3.5$, where n is the average number of hydroxyl groups, and has an average oxyethylene group-content of from 60 to 90 wt %.

According to the present invention, it is possible to obtain a coating composition to form a coating layer or film which is excellent in mechanical properties such as tensile strength, elongation and abrasion resistance while maintaining an adequate moisture permeability and which has a low degree of swelling upon absorption of water and is excellent in washing durability. This can be accomplished for the first time by the reaction between the above-mentioned specific polyoxyalkylene polyol and the specific diisocyanate. It is particularly important that the average number n of hydroxyl groups in the polyoxyalkylene polyol satisfies $3.0<n<3.5$, and diphenylmethane diisocyanate is used as the diisocyanate.

For example, the polyoxyalkylene polyol in the conventional coating composition has an average number n of hydroxyl groups, which is smaller than the above range, whereby no adequate mechanical properties can be obtained, and the swelling degree upon absorption of water tends to be high, whereby no adequate washing durability can be attained. On the other hand, if it is larger than the above range, the mechanical strength may be higher, but the flexibility or drape deteriorates substantially, whereby a coating composition having an excellent performance can hardly be obtainable.

Further, even if the average number n of hydroxyl groups satisfies the above range, if diphenylmethane diisocyanate is not used as the diisocyanate, and tolylene diisocyanate is, for example, used, no adequate mechanical properties can be obtained, the light resistance or NOx yellowing resistance tends to be poor, whereby the object of the present invention can not be accomplished, and a coating composition having an excellent performance can not be obtained.

Now, the present invention will be described in further detail.

In the present invention, the polyoxyethylene polyol having at least three hydroxyl groups and having an oxyethylene group-content of at least 10 wt %, is preferably one obtained by adding ethylene oxide, or ethylene oxide and a monoepoxide other than ethylene oxide, to a trivalent or higher valent initiator.

The trivalent or higher valent initiator is preferably a compound having a functional group to which an epoxide can be added, such as a hydroxyl group, an amino group, an imino group or a carboxyl group, wherein the number of hydrogen atoms in the functional group is at least 3. For example, a compound such as a trihydric or higher hydric alcohol, a trihydric or higher hydric phenol, an alkanolamine or a polyamine, may be employed. A trihydric or tetrahydric alcohol is preferred. Specifically, glycerol, trimethylolpropane, 1,2,6-hexanetriol, pentaerythritol, diglycerol, dextrose, sucrose, monoethanolamine, diethanolamine, triethanolamine, ethylenediamine, propylenediamine, diaminotoluene or diaminodiphenylmethane may, for example, be mentioned. Glycerol, pentaerythritol or trimethylolpropane is particularly preferred. These initiators may be used alone or in combination as a mixture of two or more of them.

As the above-mentioned monoepoxide, it is preferred to use an alkylene oxide having 3 or 4 carbon atoms, such as propylene oxide, 1,2-butylene oxide or 2,3-butylene oxide other than ethylene oxide. Such other epoxide may be used alone or may be used in combination with other alkylene oxide, such as styrene oxide, epichlorohydrin or glycidyl alkyl (or aryl) ether. The monoepoxide other than ethylene oxide is particularly preferably propylene oxide.

The method for addition of ethylene oxide and other monoepoxide to the initiator, is not particularly limited, and they may be added in a block or random form.

The components other than oxyethylene groups in the above polyoxyethylene polyol include residues of the initiator, or such residues and residues derived from the monoepoxide other than ethylene oxide. The residues of the monoepoxide other than ethylene oxide are preferably at least 5 wt %, and they are preferably residues of an alkylene oxide having 3 or 4 carbon atoms. A polyoxyethylene polyol wherein oxyalkylene groups are composed solely of oxyethylene groups, generally tends to be solid and is difficult to handle. Further, such a polyoxyethylene polyol is likely to cause solidification or high viscosity of the prepolymer which will be described hereinafter. The residues of the monoepoxide other than oxyethylene groups in the polyoxyethylene polyol, are particularly preferably at least 8 wt %.

It is preferred to have residues of propylene oxide (i.e. oxypropylene groups) as the residues of the monoepoxide other than oxyethylene groups. The polyoxyethylene polyol having such oxypropylene groups or the like, is usually liquid at room temperature and is easy to handle, and presents a prepolymer having a low viscosity. The content of polyoxyethylene groups is at least 10 wt %, and as described hereinafter, it is necessary to bring the average content of oxyethylene groups to from 60 to 90 wt %, based on the entire polyoxyalkylene polyol. The content of polyoxyethylene groups is preferably from 50 to 95 wt %, more preferably from 70 to 92 wt %.

The average hydroxyl value of the above polyoxyethylene polyol is preferably from 15 to 60. Further, the number of hydroxyl groups is preferably 3 to 4, particularly preferably larger than 3 but not more than 4. Further, the polyoxyethylene polyol may be a mixture of two or more different types.

The content of the polyoxyethylene polyol in the polyoxyalkylene polyol is required to be at least 60 wt %. It is preferably at least 80 wt %, most preferably substantially 100 wt %. A polyol other than the polyoxyethylene polyol in the polyoxyalkylene polyol may be any polyol so long as it has at least two hydroxyl groups. The polyoxyalkylene polyol other than the polyurethane type polyoxyethylene polyol is not particularly limited with respect to the oxyethylene content or the type of the initiator, other than the above. For example, a polyoxypropylene polyol containing no oxyethylene group may be mentioned.

In the present invention, the average number n of hydroxyl groups in the above oxyalkylene polyol is important and is required to satisfy 3.0<n<3.5. As mentioned above, if the average number of hydroxyl groups is higher than 3.5, the mechanical strength will be higher, but the flexibility or drape deteriorates substantially. Further, the reactivity with the curing agent increases, whereby a foaming phenomenon tends to occur, such being undesirable from the viewpoint of the coating film property. On the other hand, if the average number of hydroxyl groups is lower than 3.0, the desired mechanical strength tends to be hardly obtainable, and the degree of swelling upon absorption of water tends to be high, whereby the washing durability tends to deteriorate.

In the present invention, the average number of hydroxyl groups in the polyoxyalkylene polyol may be brought into the above range by mixing individual polyoxyalkylene polyols having different numbers of hydroxyl groups, or by adding ethylene oxide, or ethylene oxide and other monoepoxide, to a mixture of two or more initiators. However, in the present invention, it has been found that when polyoxyalkylene polyols having different numbers of hydroxyl groups are mixed, it is preferred to mix polyoxyalkylene polyols having a small difference in the number of hydroxyl groups, preferably to mix a polyoxyalkylene polyol having three hydroxyl groups and a polyoxyalkylene polyol having four hydroxyl groups, rather than mixing a polyoxyalkylene polyol having an extremely large number of hydroxyl groups and a polyoxyalkylene polyol having an extremely small number of hydroxyl groups. Thus, in the present invention, the weighted average number of hydroxyl groups in the obtainable polyoxyalkylene polyol can be brought into the above range by mixing a polyoxyalkylene polyol having three hydroxyl groups and a polyoxyalkylene polyol having four hydroxyl groups in a suitable ratio. On the other hand, when a mixture of two or more initiators is employed, it is preferred to mix initiators having a small difference in the number of hydroxyl groups. It is particularly preferred to mix a trivalent initiator and a tetravalent initiator.

Further, the average content of oxyethylene groups in the polyoxyalkylene polyol is required to be from 60 to 90 wt %. Oxyethylene groups in the polyoxyalkylene polyol are groups which bring about hydrophilicity to the resin. If the average content of such oxyethylene groups is lower than 60 wt %, the moisture permeability tends to decrease. On the other hand, if it exceeds 90 wt %, the degree of swelling upon absorption of water tends to be high, whereby the washing durability tends to deteriorate. The content of oxyethylene groups in the polyoxyethylene polyol is particularly preferably from 50 to 95 wt %, most preferably from 70 to 92 wt %.

Further, in the present invention, the average hydroxyl value of the polyoxyalkylene polyol is preferably from 15 to 60. If the average hydroxyl value is higher than this range, the flexibility or drape of the polyurethane resin tends to deteriorate, and hard blocks having a low hydrophilicity in the polyurethane resin relatively increase, whereby the hydrophilicity decreases, such being undesirable. On the other hand, if the average hydroxyl value is lower than this range, the viscosity of the prepolymer increases, and the reaction rate of the prepolymer with the curing agent tends to decrease, such being undesirable. Particularly preferably, the average hydroxyl value is from 30 to 58.

The isocyanate to be used in the present invention is required to be diphenylmethane diisocyanate to accomplish the object of the present invention. As the diphenylmethane diisocyanate, 4,4'-diphenylmethane diisocyanate and various isomers thereof or their mixture may be employed. Further, it may be used in combination with other polyisocyanate such as a modified product of a carbodiimide-modified diphenylmethane diisocyanate or polymeric diphenylmethane diisocyanate.

In the present invention, the above-mentioned polyoxyalkylene polyol and diphenylmethane diisocyanate or a mixture of diphenylmethane diisocyanate with other polyisocyanate, are reacted preferably under a condition that isocyanate groups are stoichiometrically excessive, whereby an isocyanate group-containing prepolymer is produced. The proportions of the polyoxyalkylene polyol and diphenylmethane diisocyanate or a mixture of diphenylmethane diisocyanate with other polyisocyanate, are preferably such that isocyanate groups/hydroxyl groups is from 1 to 10, more preferably from 1.5 to 5, particularly preferably from 1.8 to 4.5.

In the present invention, a curing agent may be used for curing the above isocyanate group-containing prepolymer. Namely, the coating composition of the present invention preferably comprises at least two components comprising the main component containing the isocyanate group-containing prepolymer and a curing agent component containing a curing agent for the isocyanate group-containing prepolymer.

As the curing agent, a compound having at least two functional groups comprising active hydrogen groups, is employed. Particularly, a polyol, an alkanolamine or a polyamine, having a relatively low molecular weight, is employed. A particularly preferred curing agent is a diol or diamine having a molecular weight of at most 400, preferably at most 300, particularly preferably at most 200. Specifically, ethylene glycol, 1,4-butanediol, neopentyl glycol, 1,6-hexanediol, 1,5-pentanediol, ethylenediamine, tetramethylenediamine, hexamethylenediamine, dichlorobenzidine or isophoronediamine, may preferably be mentioned.

Otherwise, it is possible to carry out the curing by moisture in air or a polyamine vapor without using the above curing agent.

The amount of such a curing agent is preferably such that the active hydrogen-containing functional groups of the curing agent are from 0.3 to 1.3 mols, particularly preferably from 0.4 to 1.0 mols, per mol of the isocyanate groups of the isocyanate group-containing prepolymer.

To the coating composition of the present invention, various components may be incorporated in addition to the main materials such as the isocyanate group-containing prepolymer and the curing agent therefor. The viscosity (25° C.) of the prepolymer is preferably at most 20,000 cP, whereby a substantially solventless coating composition can be made. However, a prepolymer having a viscosity exceeding 20,000 cP, may also be used for a coating composition by employing a solvent. As other components, various stabilizers so-called an antioxidant, a photostabilizer and an ultraviolet absorber, may be incorporated. Further, in order to accelerate the curing reaction, a catalyst for urethane conversion, such as a tertiary amine or an organic tin compound, may be incorporated. Further, a flame retardant, a filler, a coloring agent, a plasticizer, etc. can be optionally incorporated.

The coating composition of the present invention is useful for an application to obtain a coating layer or film by coating and curing it on a porous substrate or a substrate having a release property. The obtained coating layer or film is required to be substantially non-porous. Accordingly, a curing method to form a porous layer such as a wet solidification method, is not employed.

The coating layer or film obtained from the coating composition of the present invention may be of a foam having bubbles. Namely, it may be a coating layer or film in the form of a foam having substantially no air permeability. However, the coating layer or film obtainable from the coating composition of the present invention is preferably substantially foamless i.e. a substantially solid coating layer or film.

Now, the present invention will be described in further detail with reference to Examples (Examples 1 and 2), and Comparative Examples (Examples 3 to 6). However, it should be understood that the present invention is by no means restricted by such specific Examples. In these Examples, "parts" means "parts by weight".

EXAMPLE 1

A mixture of ethylene oxide and propylene oxide (weight ratio 80:20) was added to glycerol to obtain a polyoxyethylene/oxypropylene triol having a hydroxyl value of 48.1 (this will be referred to as triol A). 530 Parts of triol A and 227 parts of a polyoxyethylene/oxypropylene tetraol having a hydroxyl value of 46.0 (one obtained by adding a mixture of ethylene oxide and propylene oxide (weight ratio 80:20) to pentaerythritol) were mixed to obtain a polyoxyalkylene polyol (average number n of hydroxyl groups: 3.3, average hydroxyl value: 47.5).

To the polyoxyalkylene polyol obtained as described above, 320 parts of 4,4'-diphenylmethane diisocyanate was added and reacted at 70° C. for 5 hours to obtain an isocyanate group-containing prepolymer having an isocyanate group-content of 7.2 wt % and a viscosity (25° C., the same applies hereinafter) of 14,000 cP (this will be referred to as prepolymer B).

To 200 parts of the above prepolymer B, 13.7 parts of hexamethylenediamine was added and mixed, and the mixture was coated on a release paper in a thickness of 0.05 mm, which was bonded to a 70 denier nylon taffeta and left to stand in a constant temperature chamber of 100° C. for 3 hours for curing, whereupon the release paper was peeled. Using this fabric, the moisture permeability was measured in accordance with JIS Z-0208.

On the other hand, prepolymer B and hexamethylenediamine were mixed in the same ratio as mentioned above to obtain a film having a thickness of 0.2 mm on a release paper. With respect to this film, the mechanical properties i.e. the elongation (%), the tensile strength (kg/cm$^2$) and the 100% modulus $M_{100}$ (kg/cm$^2$) were measured in accordance with JIS K-6301.

Further, the above film was cut out in a disc having a diameter of 45 mm and immersed in water of 23° C. for 15 minutes, whereupon the diameter was measured, and the degree of swelling upon absorption of water was measured in accordance with the following formula.

Degree of swelling upon absorption of water (%)={(Diameter after immersion in water−diameter prior to immersion in water)/diameter prior to immersion in water}×100

These test results are shown in Table 1.

EXAMPLE 2

620 Parts of a polyoxyethylene/oxypropylene triol having a hydroxyl value of 48.2, obtained by adding a mixture of ethylene oxide and propylene oxide (weight ratio 70:30) to glycerol, and 96 parts of a polyoxyethylene/oxypropylene tetraol having a hydroxyl value of 46.0 (one obtained by adding a mixture of ethylene oxide and propylene oxide (weight ratio 70:30) to pentaerythritol) were mixed to obtain a polyoxyalkylene polyol (average number n of hydroxyl groups: 3.1, average hydroxyl value: 47.9).

To the polyoxyalkylene polyol obtained as described above, 292 parts of 4,4'-diphenylmethane diisocyanate was reacted at 70° C. for 5 hours to obtain an isocyanate group-containing prepolymer having an isocyanate group-content of 7.0 wt % and a viscosity of 14,000 cP (this will be referred to as prepolymer C).

To 200 parts of prepolymer C, 13.3 parts of hexamethylenediamine was added and mixed, and in the same manner as in Example 1, the water permeability, the mechanical properties and the degree of swelling upon absorption of water were measured. The results are shown in Table 1.

EXAMPLE 3

To 760 parts of triol A, 285 parts of 4,4'-diphenylmethane diisocyanate was added and reacted at 70° C. for 5 hours to obtain an isocyanate group-containing prepolymer having an isocyanate group-content of 6.1 wt % and a viscosity of 15,000 cP (this will be referred to as prepolymer D). To 200 parts of prepolymer D, 11.6 parts of hexamethylenediamine was mixed, and in the same manner as in Example 1, the moisture permeability, the mechanical properties and the degree of swelling upon absorption of water were measured. The results are shown in Table 1.

EXAMPLE 4

456 Parts of triol A and 304 parts of a polyoxyethylene/oxypropylene diol having a hydroxyl value of 56.1 obtained by adding a mixture of ethylene oxide and propylene oxide (weight ratio 80:20) to propylene glycol, were mixed to obtain a polyoxyalkylene polyol (average number n of hydroxyl groups: 2.6, average hydroxyl value: 51.3).

To the polyoxyalkylene polyol obtained as described above, 183 parts of tolylene diisocyanate was added and reacted at 90° C. for 5 hours to obtain an isocyanate group-containing prepolymer having an isocyanate group-content of 6.2 wt % and a viscosity of 5,400 cP (this will be referred to as prepolymer E).

To 200 parts of prepolymer E, 11.8 parts of hexamethylenediamine was added and mixed, and in the same manner as in Example 1, the moisture permeability, the mechanical properties and the degree of swelling upon absorption of water were measured. The results are shown in Table 1.

EXAMPLE 5

76 Parts of triol A and 684 parts of a polyoxyethylene/oxypropylene diol having a hydroxyl value of 56.1 obtained by adding a mixture of ethylene oxide and propylene oxide (weight ratio 80:20) to propylene glycol, were mixed to obtain a polyoxyalkylene polyol (average number n of hydroxyl groups: 2.1, average hydroxyl value: 55.3).

To such a polyoxyalkylene polyol, 228 parts of 4,4'-diphenylmethane diisocyanate was added and reacted at 70° C. for 5 hours to obtain an isocyanate group-containing prepolymer having an isocyanate group-content of 4.5 wt % and a viscosity of 12,400 cP (this will be referred to as prepolymer F).

To 200 parts of prepolymer F, 8.6 parts of hexamethylenediamine was added and mixed, and in the same manner as in Example 1, the moisture permeability, the mechanical properties and the degree of swelling upon absorption of water, were measured. The results are shown in Table 1.

EXAMPLE 6

820 Parts of triol A and 190 parts of tolylene diisocyanate were reacted at 90° C. for 5 hours to obtain an isocyanate group-containing prepolymer having an isocyanate group-content of 6.1 wt % and a viscosity of 6,200 cP (this will be referred to as prepolymer G).

To 200 parts of prepolymer G, 11.6 parts of hexamethylenediamine was added and mixed, and in the same manner as in Example 1, the moisture permeability, the mechanical properties and the degree of swelling upon absorption of water, were measured. The results are shown in Table 1.

TABLE 1

| Example | Average number of hydroxyl groups | Average hydroxyl value | Moisture permeability (g/m$^2$ · 24 h) | Elongation (%) | Tensile strength (kg/cm$^2$) | $M_{100}$ (kg/cm$^2$) | Degree of swelling upon absorption of water (%) |
|---|---|---|---|---|---|---|---|
| 1 | 3.3 | 47.5 | 14,000 | 130 | 110 | 90 | 12 |
| 2 | 3.1 | 47.9 | 12,000 | 140 | 118 | 78 | 9 |
| 3 | 3.0 | 48.1 | 16,000 | 160 | 95 | 65 | 16 |
| 4 | 2.6 | 51.3 | 21,000 | 240 | 48 | 19 | 32 |
| 5 | 2.1 | 55.3 | 17,000 | 350 | 90 | 24 | 28 |
| 6 | 3.0 | 48.1 | 19,000 | 200 | 62 | 23 | 26 |

According to the present invention, it is possible to obtain a coating composition for forming a coating layer or film which is excellent in mechanical properties such as tensile strength, elongation and abrasion resistance, while maintaining adequate moisture permeability and which has a low degree of swelling upon absorption of water and is excellent in washing durability.

What is claimed is:

1. A coating composition to form a coating layer or film of a hydrophilic polyurethane resin having a moisture permeability and being non-porous, which comprises an isocyanate group-containing prepolymer obtained by reacting diphenylmethane diisocyanate with the following mixture of polyoxyalkylene polyols:

a mixture of polyoxyalkylene polyols which contains at least 60 wt %, based on the mixture of polyoxyalkylene polyols, of a polyoxyethylene polyol, said polyoxyethylene polyol having at least three hydroxyl groups and having an oxyethylene group-content of at least 10 wt %, based on the polyoxyethylene polyol; wherein said mixture of polyoxyalkylene polyols satisfies 3.0<n<3.5, where n is the average number of hydroxyl groups, and has an average oxyethylene group-content of from 60 to 90 wt %, based on the mixture of polyoxyalkylene polyols, wherein the mixture of polyoxyalkylene polyols excludes polyoxyalkylene polyols containing only two hydroxyl groups.

2. The coating composition according to claim 1, wherein the mixture of polyoxyalkylene polyols has an average hydroxyl value of from 15 to 60.

3. The coating composition according to claim 1, wherein the mixture of polyoxyalkylene polyols is a mixture of a polyoxyalkylene polyol having three hydroxyl groups and a polyoxyalkylene polyol having four hydroxyl groups.

4. The coating composition according to claim 1, which contains, in addition to the main component of the isocyanate group-containing prepolymer, a curing agent component for the isocyanate group-containing prepolymer.

5. The coating composition according to claim 4, wherein the curing agent component is a diol and/or a diamine, having a molecular weight of at most 400.

6. A coating layer or film obtained from the coating composition as defined in claim 1.

7. A laminate comprising a substrate and a coating layer laminated on the substrate, wherein the coating layer is obtained from the coating composition as defined in claim 1.

8. A method comprising forming a coating layer obtained from the coating composition as defined in claim 1 on a substrate to thereby form a laminate of said substrate and said coating layer.

* * * * *